(12) United States Patent
Wang et al.

(10) Patent No.: US 10,486,307 B2
(45) Date of Patent: Nov. 26, 2019

(54) ROBOT CONTROL DEVICE AND COMPUTER READABLE MEDIUM

(71) Applicant: FANUC CORPORATION, Minamitsuru-gun, Yamanashi (JP)

(72) Inventors: Kaimeng Wang, Yamanashi (JP); Hajime Suzuki, Yamanashi (JP); Shuusuke Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/964,397

(22) Filed: Apr. 27, 2018

(65) Prior Publication Data

US 2018/0326584 A1 Nov. 15, 2018

(30) Foreign Application Priority Data

May 11, 2017 (JP) .................................. 2017-094702

(51) Int. Cl.
*B25J 9/16* (2006.01)

(52) U.S. Cl.
CPC ........... *B25J 9/1661* (2013.01); *B25J 9/1664* (2013.01); *B25J 9/1669* (2013.01); *B25J 9/1697* (2013.01)

(58) Field of Classification Search
CPC ...... B25J 9/1661; B25J 9/1664; B25J 9/1669; B25J 9/1697; B25J 9/1674;
(Continued)

(56) References Cited

U.S. PATENT DOCUMENTS 8,909,374 B2 * 12/2014 Fudaba ................... B25J 13/02
700/253
2014/0288707 A1 9/2014 Asahi et al.
(Continued)

FOREIGN PATENT DOCUMENTS

CN 101970185 2/2011
CN 103528604 1/2014
(Continued)

OTHER PUBLICATIONS

Office Action dated Mar. 1, 2019 in German Patent Application No. 102018206077.0.
(Continued)

*Primary Examiner* — Bao Long T Nguyen
(74) *Attorney, Agent, or Firm* — Wenderoth, Lind & Ponack, L.L.P.

(57) ABSTRACT

A robot control device that controls a robot that executes operations in the same area as an operator includes: an information acquisition unit that acquires information indicating a control state of the robot, information indicating an attitude of the operator, and information indicating a position of an operating target object in the operations; an estimating unit that estimates an operation in execution on the basis of respective pieces of information acquired by the information acquisition unit; a required time calculating unit that calculates a required time required until the operation in execution ends on the basis of the estimated operation in execution; an operation plan creating unit that creates an operation plan of the robot on the basis of the required time; and a control unit that controls the robot so as to execute operations according to the operation plan.

8 Claims, 9 Drawing Sheets

(58) Field of Classification Search
CPC ........ G05B 19/41805; G05B 19/41815; G05B 19/4183–41835; G05B 19/41865; G05B 2219/40116
USPC .......................................... 700/245, 250, 258
See application file for complete search history.

(56) References Cited

U.S. PATENT DOCUMENTS

2015/0293596 A1* 10/2015 Krausen .................. B25J 13/02
                                                      606/130
2016/0059412 A1*  3/2016 Oleynik .................. B25J 9/163
                                                      700/257
2018/0243922 A1*  8/2018 Hashimoto ............. B23P 19/04

FOREIGN PATENT DOCUMENTS

| CN | 106363622      | 2/2017  |
|----|----------------|---------|
| DE | 102005003827   | 7/2006  |
| DE | 102010005708   | 7/2010  |
| DE | 10 2009 046 107| 5/2011  |
| DE | 102011109908   | 2/2012  |
| DE | 10 2015 220 517| 4/2017  |
| EP | 3 238 893      | 11/2017 |
| JP | 2007-283450    | 11/2007 |
| JP | 2010-120139    | 6/2010  |
| JP | 2010-188515    | 9/2010  |
| JP | 2013-151063    | 8/2013  |
| JP | 2016-59985     | 4/2016  |
| JP | 2016-159407    | 9/2016  |
| JP | 2017-39170     | 2/2017  |
| WO | 2017/203937    | 11/2017 |

OTHER PUBLICATIONS

Office Action dated Jul. 16, 2019 in corresponding Chinese Patent Application No. 201810433393.3.

* cited by examiner

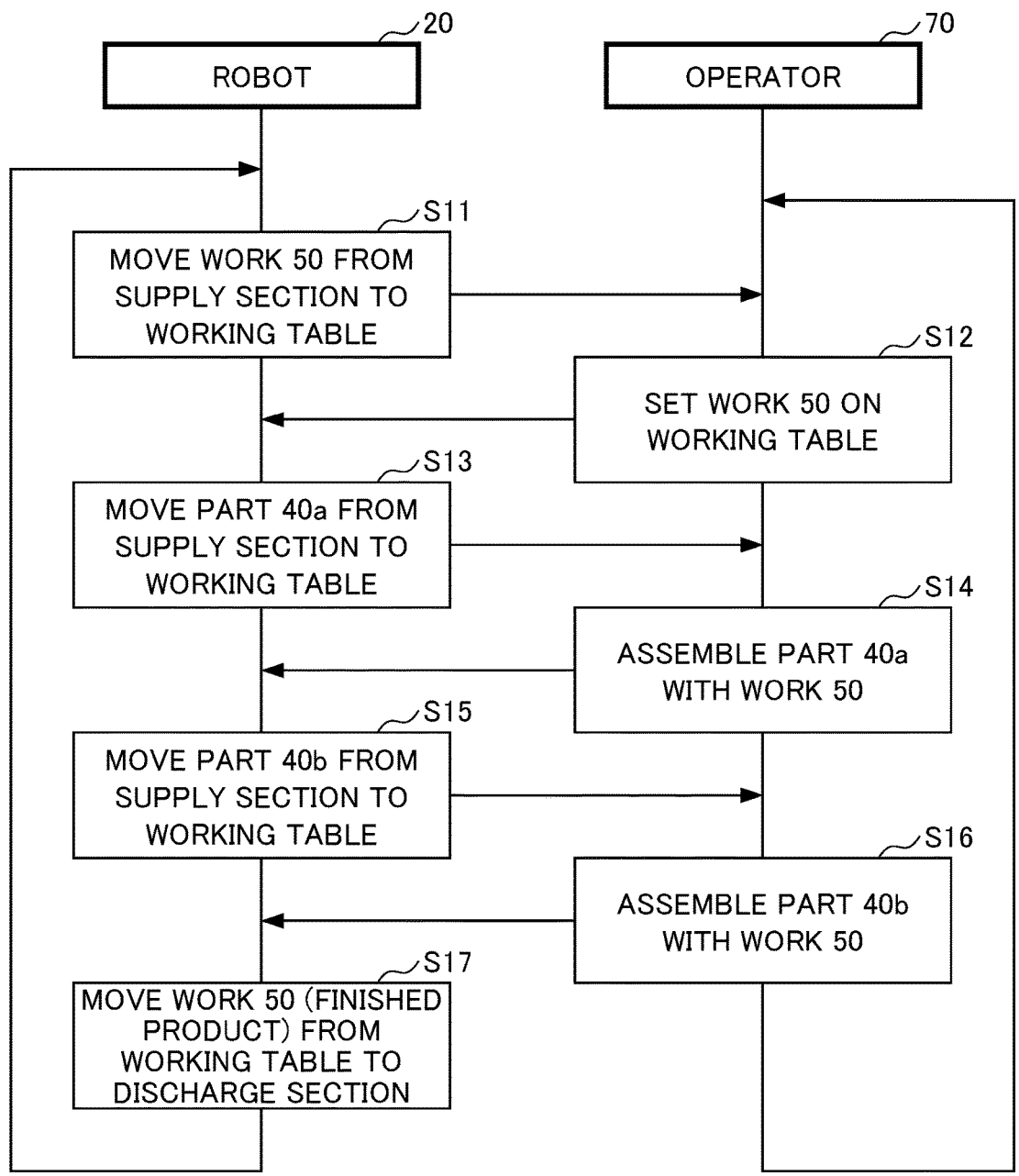

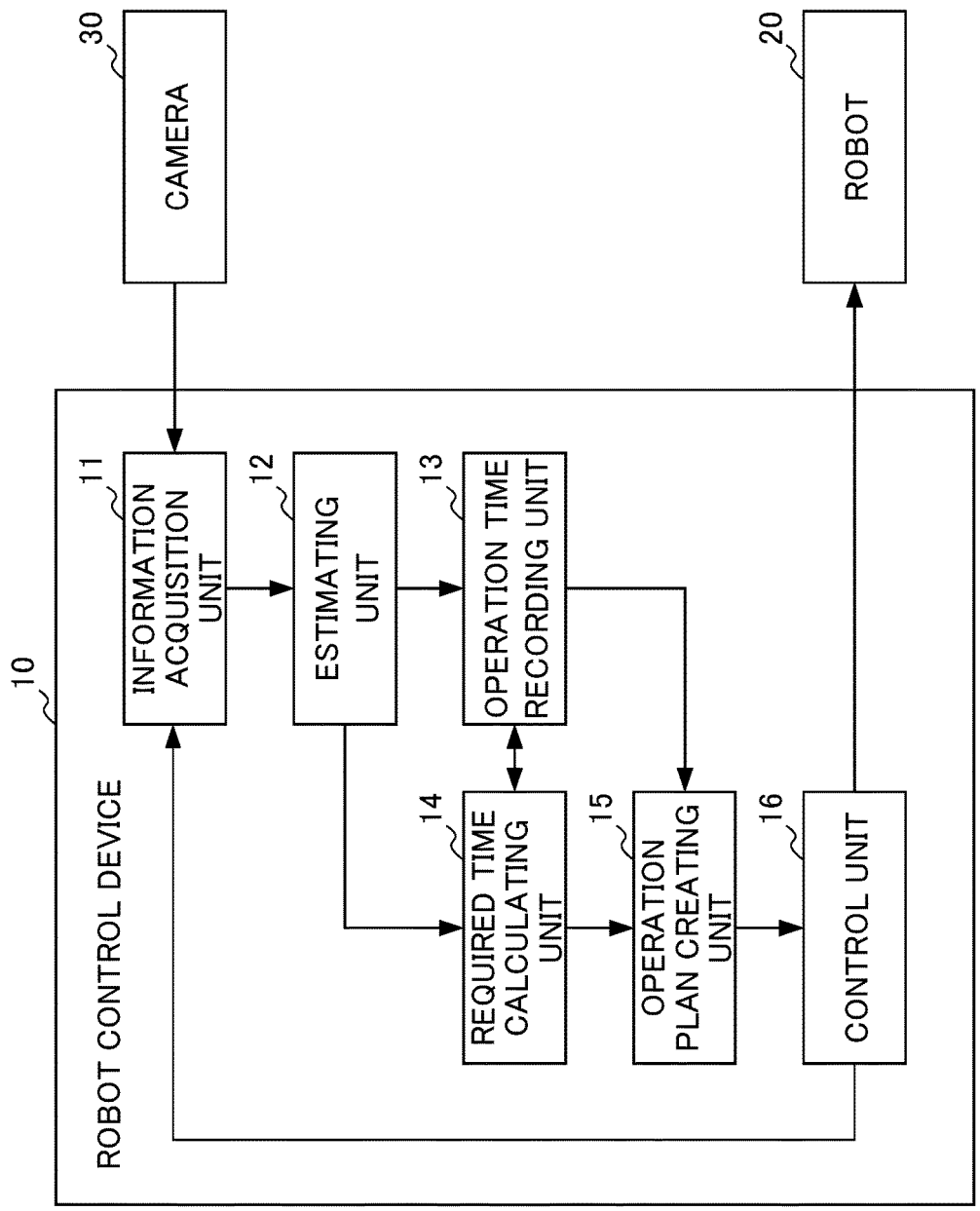

FIG. 4A

<OPERATION HISTORY DATABASE>

| STARTING TIME | STATE AND STEP OF ROBOT | OPERATOR STATE DETECTED FROM CAPTURING DATA | OPERATION OF OPERATOR ESTIMATED FROM OPERATOR STATE | OPERATION TIME |
|---|---|---|---|---|
| ... | | | | |
| 1:00 | DURING CONVEYING OF PART 40a | WAITING | WAITING | 0:10 |
| 1:10 | WAITING | DURING ASSEMBLING OF PART 40a | DURING ASSEMBLING OF PART 40a | 1:00 |
| 2:10 | DURING CONVEYING OF PART 40b | WAITING | WAITING | 0:15 |
| 2:25 | WAITING | DURING ASSEMBLING OF PART 40b | DURING ASSEMBLING OF PART 40b | 0:30 |
| ... | | | | |

FIG. 4B

<AVERAGE OPERATION TIME DATABASE>

| OPERATION | AVERAGE OPERATION TIME |
|---|---|
| ... | |
| CONVEY PART 40a | $T_R(a)$ |
| ASSEMBLE PART 40a | $T_O(a)$ |
| CONVEY PART 40b | $T_R(b)$ |
| ... | |

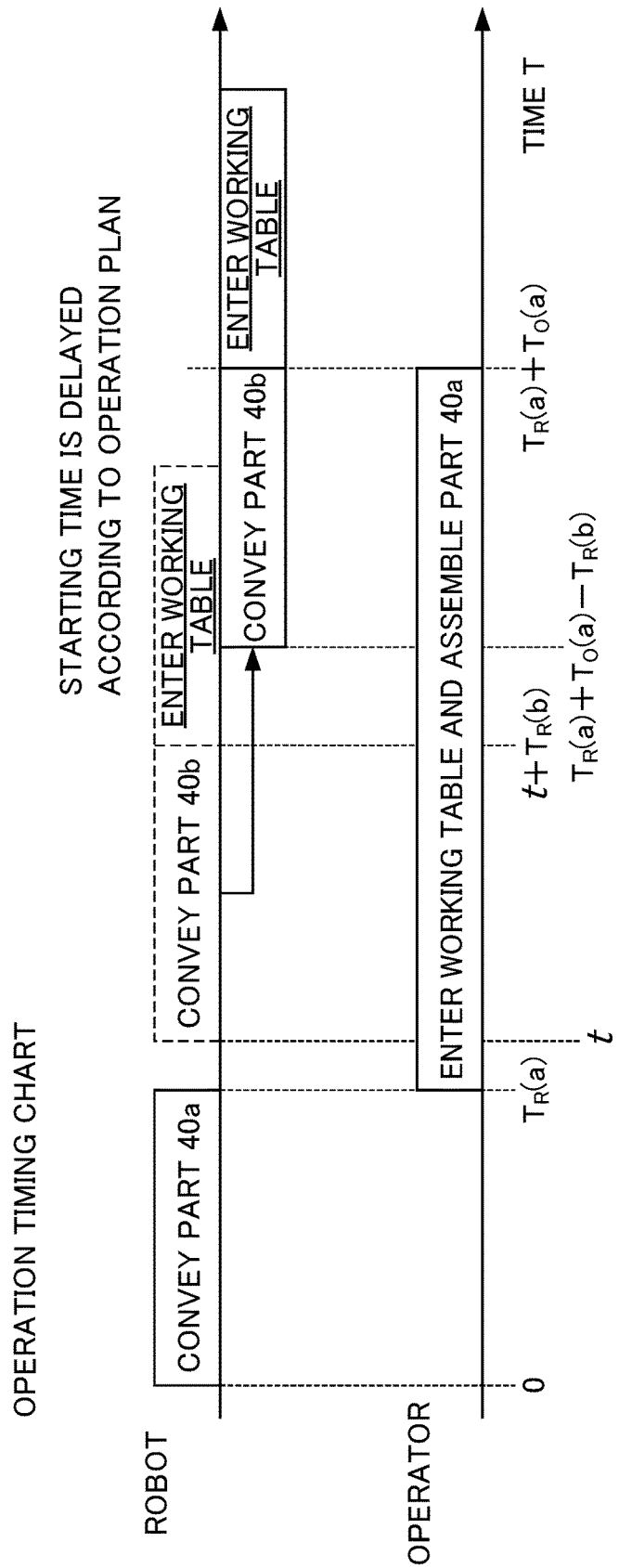

ROBOT CONTROL DEVICE AND COMPUTER READABLE MEDIUM

This application is based on and claims the benefit of priority from Japanese Patent Application No. 2017-094702, filed on 11 May 2017, the content of which is incorporated herein by reference.

BACKGROUND OF THE INVENTION

Field of the Invention

The present invention relates to a robot control device and a robot control program for controlling a robot, and particularly, to a robot control device and a computer readable medium for controlling a robot that performs an operation in the same area as an operator.

Related Art

Conventionally, in a field of an industrial robot and the like, in order to improve the efficiency of production and assembly, a robot and an operator sometimes perform operations in the same area. In this case, the robot and the operator may interfere with each other so that the robot and the operator may come into contact with each other in a working area, which is undesirable. A technique for preventing the occurrence of such interference is disclosed in Patent Document 1, for example. In the technique disclosed in Patent Document 1, the state of the robot and the operator in operation is detected. When it is determined that the robot and the operator are likely to interfere with each other on the basis of the detected state of the robot or the operator and learning information obtained in advance, the robot is stopped or decelerated immediately to avoid the occurrence of interference.

Patent Document 1:
Japanese Unexamined Patent Application, Publication No. 2016-159407

SUMMARY OF THE INVENTION

In the technique disclosed in Patent Document 1, an operation is executed in a state in which it is unclear whether interference will occur or not and it is determined whether interference occurs or not during execution of the operation. If an operation can be executed after creating an operation plan so that interference does not occur rather than executing an operation in a state in which it is unclear whether interference will occur or not, it may be possible to increase the operation efficiency, which may lead to improvement in productivity.

Therefore, an object of the present invention is to provide a robot control device and a robot control program capable of creating an operation plan so that interference between an operator and a robot does not occur.

(1) A robot control device (for example, a robot control device 10 to be described later) of the present invention is a robot control device that controls a robot (for example, a robot 20 to be described later) that executes operations in the same area as an operator, the robot control device including: an information acquisition unit (for example, an information acquisition unit 11 to be described later) that acquires information indicating a control state of the robot, information indicating an attitude of the operator, and information indicating a position of an operating target object in the operations; an estimating unit (for example, an estimating unit 12 to be described later) that estimates an operation in execution on the basis of respective pieces of information acquired by the information acquisition unit; a required time calculating unit (for example, a required time calculating unit 14 to be described later) that calculates a required time required until the operation in execution ends on the basis of the estimated operation in execution; an operation plan creating unit (for example, an operation plan creating unit 15 to be described later) that creates an operation plan of the robot on the basis of the required time; and a control unit (for example, a control unit 16 to be described later) that controls the robot so as to execute operations according to the operation plan.

(2) The robot control device according to (1) may further include: an operation time recording unit (for example, an operation time recording unit 13 to be described later) that stores the estimated operation of the estimating unit and an operation time which is a time elapsed until the estimated operation ends after the estimated operation starts in correlation, wherein the required time calculating unit reads an operation time corresponding to a calculation target operation of the required time from the operation time recording unit and calculates the required time on the basis of the read operation time.

(3) In the robot control device according to (2), the required time calculating unit may calculate a time obtained by averaging the read operation times as the required time.

(4) In the robot control device according to any one of (1) to (3), the information acquisition unit may further acquire identification information for identifying the operator, and the required time calculating unit may calculate the required time required until the operation in execution ends on the basis of the estimated operation in execution and an operator specified on the basis of the acquired identification information.

(5) In the robot control device according to any one of (1) to (4), the operation plan creating unit may create the operation plan so that the robot enters the same area after the required time of the operation by the operator has elapsed.

(6) In the robot control device according to any one of (1) to (5), the operation plan creating unit may create the operation plan so that a period in which the robot and the operator are present in the same area decreases.

(7) In the robot control device according to any one of (1) to (6), the operation plan creating unit may create the operation plan so that a waiting period of the operator decreases.

(8) A robot control program of the present invention is a robot control program for causing a computer to function as a robot control device (for example, a robot control device 10 to be described later) that controls a robot (for example, a robot 20 to be described later) that executes operations in the same area as an operator, the robot control device including: an information acquisition unit (for example, an information acquisition unit 11 to be described later) that acquires information indicating a control state of the robot, information indicating an attitude of the operator, and information indicating a position of an operating target object in the operations; an estimating unit (for example, an estimating unit 12 to be described later) that estimates an operation in execution on the basis of respective pieces of information acquired by the information acquisition unit; a required time calculating unit (for example, a required time calculating unit 14 to be described later) that calculates a required time required until the operation in execution ends on the basis of the estimated operation in execution; an operation plan creating unit (for example, an operation plan creating unit 15 to be described later) that creates an operation plan of the robot on the basis of the required time; and a control unit (for example, a control unit 16 to be described later) that controls the robot so as to execute operations according to the operation plan.

According to the present invention, it is possible to make an operation plan so that interference between an operator and a robot does not occur.

BRIEF DESCRIPTION OF THE DRAWINGS

FIG. 2 is a sequence diagram illustrating an example of operation steps to which an embodiment of the present invention is applied.

FIG. 3 is a diagram illustrating functional blocks of a robot control device according to an embodiment of the present invention.

FIG. 4A is a diagram illustrating an example of an operation history database according to an embodiment of the present invention.

FIG. 4B is a diagram illustrating an example of an average operation time database according to an embodiment of the present invention.

FIG. 5 is a timing chart for describing generation of an operation plan according to an embodiment of the present invention.

DETAILED DESCRIPTION OF THE INVENTION

General Configuration of Embodiment

Figure 1:
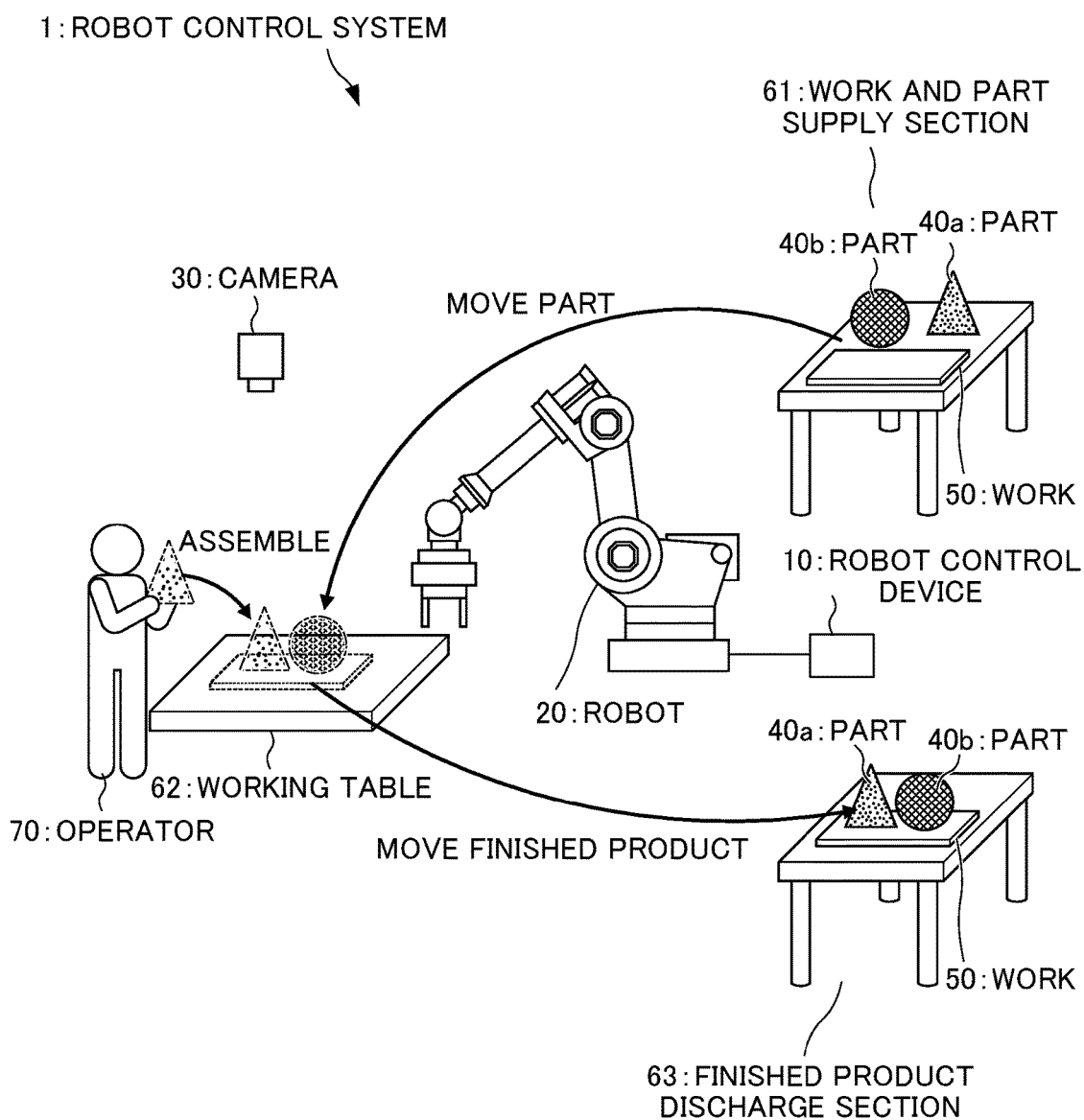
FIG. 1 is a schematic diagram illustrating a basic entire configuration of an embodiment of the present invention.

First, a configuration of an entire robot control system 1 according to the present embodiment will be described with reference to FIG. 1. As illustrated in FIG. 1, the robot control system 1 includes a robot control device 10, a robot 20, and a camera 30. In the drawing, a part 40a, a part 40b, a work 50, a work and part supply section 61, a working table 62, a finished product discharge section 63, and an operator 70 are illustrated.

The robot control device 10 and the robot 20 are communicably connected. Moreover, the robot control device 10 and the camera 30 are also communicably connected. These connections may be cable connection via a signal line and may be wireless connection. Moreover, the robot control device 10, the robot 20, and the camera 30 may be connected via a network such as the Internet. The robot control device 10, the robot 20, and the camera 30 communicate with each other via the connections.

The robot control device 10 is a device for controlling the operation of the robot 20. The robot control device 10 includes various functional blocks for controlling the operation of the robot 20. The details of the functional blocks will be described later with reference to FIG. 3. The robot control device 10 can be realized by adding functions unique to the present embodiment to an ordinary robot control device (a robot controller).

The robot 20 is a robot that operates on the basis of the control of the robot control device 10. The robot 20 includes a movable unit such as an arm and end effectors (for example, a gripper for gripping a work) that operate on the basis of the control of the robot control device 10. The robot 20 can be realized as such an ordinary industrial robot that is used in a factory where automobiles and electronic parts are produced.

The camera 30 is a camera that captures the surroundings of the working table 62. The camera 30 can be realized as an ordinary camera. The capturing data obtained by the camera 30 is output to the robot control device 10.

Example of Operation Step

In the following description, a case of performing an operation of assembling the parts 40a and 40b with respect to the work 50 to create a finished product will be described as an example. In this operation, the robot 20 conveys the work 50 and the parts 40a and 40b and the operator 70 assembles the parts 40a and 40b with respect to the work 50.

The steps of this operation will be described with reference to the flowchart of FIG. 2. First, the robot 20 conveys the work 50 mounted in the work and part supply section 61 with respect to the working table 62 (step S11). The operator 70 sets the conveyed work 50 on the working table (step S12).

The robot 20 conveys the part 40a mounted in the work and part supply section 61 with respect to the working table 62 (step S13). The operator 70 assembles the conveyed part 40a with respect to the work 50 (step S14).

Subsequently, the robot 20 conveys the part 40b mounted in the work and part supply section 61 with respect to the working table 62 (step S15). The operator 70 assembles the conveyed part 40b with respect to the work 50 (step S16).

In this way, a finished product is obtained. After that, the robot 20 conveys the obtained finished product with respect to the finished product discharge section 63 (step S17). The above-described operation step is repeatedly performed by cooperation of the robot 20 and the operator 70, whereby a desired number of finished products can be obtained.

Here, since the working table 62 is a working area which both the robot 20 and the operator 70 can enter, interference between the operator 70 and the robot 20 may occur. Here, interference means a state in which both the robot 20 and the operator 70 enter the working table 62 although the robot 20 and the operator 70 are not performing a cooperative operation in the working table 62, for example. When such interference occurs, the robot 20 and the operator 70 may come into unexpected contact with each other.

Therefore, in the present embodiment, the robot control device 10 estimates an operation being executed presently on the basis of the state of the robot 20 and the operator 70 and the state of the parts 40a and 40b. The robot control device 10 creates an operation plan of the robot 20 so that a period in which the robot 20 and the operator 70 are simultaneously present in the working table 62 is minimized. That is, in the present embodiment, it is possible to make an operation plan so that interference between the operator and the robot does not occur. Moreover, the robot control device 10 controls the robot 20 so that the robot 20 operates according to the operation plan. In this way, in the present embodiment, it is possible to secure the safety of the operator without diminishing productivity.

Configuration of Robot Control Device 10

Next, the configuration of the robot control device 10 for realizing such a process will be described with reference to FIG. 2. As illustrated in FIG. 2, the robot control device 10 includes an information acquisition unit 11, an estimating unit 12, an operation time recording unit 13, a required time calculating unit 14, an operation plan creating unit 15, and a control unit 16. FIG. 2 also illustrate the robot 20 and the camera 30 that transmit and receive information to and from the functional blocks in the robot control device 10 in addition to the robot control device 10. On the other hand, the parts 40a and 40b and the operator 70 illustrated in FIG. 1 are not illustrated in FIG. 2.

The information acquisition unit 11 is a unit that acquires information indicating the states of the robot 20, the operator 70, the parts 40a and 40b, and the work 50. The information acquisition unit 11 outputs the acquired respective pieces of information to the estimating unit 12.

Here, the information acquisition unit 11 acquires the capturing data obtained by the camera 30 as the information indicating the states of the operator 70, the parts 40a and 40b, and the work 50. As described above, the capturing data is obtained by capturing the surroundings of the working table 62 and includes the state of the operator 70 entering the working table 62 and the states of the parts 40a and 40b and the work 50 in the working table 62.

The information acquisition unit 11 acquires information indicating the control state of the robot 20 from the control unit 16 to be described later as the information indicating the state of the robot 20. The information indicating the control state is, for example, information indicating the position of an arm and a gripper of the robot 20, information indicating an open/close state of the gripper of the robot 20, and information indicating the details of an operation executed by the robot 20. These pieces of information are generated on the basis of a control signal (for example a position command) that the control unit 16 outputs to the robot 20 in order to control the robot 20, a feedback signal for feedback control, or information on a processing program and the like read by the control unit 16. The information acquisition unit 11 may acquire the information indicating the state of the robot 20 from the capturing data of the camera 30 rather than acquiring the same from the control unit 16.

The estimating unit 12 estimates an operation being executed presently on the basis of the respective pieces of information acquired by the information acquisition unit 11 among a plurality of operations included in operation steps. For example, when it is specified on the basis of the respective pieces of information acquired by the information acquisition unit 11 that, although the work 50 is mounted in the finished product discharge section 63, the part 40a is not assembled to the work 50 and the operator 70 is entering the working table 62, it is estimated that the operator 70 is executing an operation of assembling the part 40a with respect to the work 50 (the operation of step S14 in FIG. 2).

In order to estimate the operation being executed presently, the estimating unit 12 stores the details of respective operations included in the operation steps and the order of executing the respective operations in advance. In order to estimate the operation being executed, it is effective to specify an attitude of the operator 70. The estimating unit 12 may use the technique disclosed in Japanese Unexamined Patent Application, Publication No. 2001-092978, for example, in order to specify the attitude or the like of a person on the basis of the image of the person captured by a camera. The estimation results obtained by the estimating unit 12 are output to the operation time recording unit 13.

The operation time recording unit 13 constructs an "operation history database" on the basis of the estimation results input from the estimating unit 12. The operation time recording unit 13 updates the operation history database whenever new estimation results are input. In the operation time recording unit 13, an "average operation time database" is also constructed by a required time calculating unit 14 to be described later. The required time calculating unit 14 updates the average operation time database. Examples of information stored in the two databases will be described with reference to FIGS. 4A and 4B.

As illustrated in FIG. 4A, the operation history database stores "time", "state and operation of robot 20", "state of operator 70 detected from capturing data", "estimated operation of operator", and "operation time" in correlation with each operation.

"Starting time" is the time point at which an operation starts. Here, in the present embodiment, "operation time" to be described later is calculated on the basis of the starting time. This operation time is preferably specified as accurately as possible. Therefore, estimation of the estimating unit 12 is repeated at least at a predetermined frequency (for example, every second). In this way, since the starting time of an operation can be specified accurately, the operation time can be calculated accurately.

The "state and operation of robot 20" is information indicating the state of the robot 20 and the operation executed by the robot 20. Here, as described above, the information acquisition unit 11 can acquire the state of the robot 20 from the control unit 16, and the estimating unit 12 can uniquely specify an operation executed by the robot 20 on the basis of the state. Due to this, the state and the operation of the robot 20 are regarded as one item rather than separate items.

The "state of operator 70 detected from capturing data" is information indicating the state of an operator detected from the capturing data obtained by the camera 30.

The "estimated operation of operator" is information indicating the operation estimated by the estimating unit 12 on the basis of the state of the operator 70 detected from the capturing data. Here, there may be a case in which it is not possible to uniquely estimate the "estimated operation of operator" from the "state of operator 70 detected from capturing data". In such a case, the "state of operator 70 detected from capturing data" and the "estimated operation of operator" are regarded as separate items so that a user can edit the content of the "estimated operation of operator".

In the drawing, in order to simplify the description, the "state of operator 70 detected from capturing data" and the "estimated operation of operator" have the same content. However, actually, for example, the "state of operator 70 detected from capturing data" may be "state in which operator 70 is entering working table 62" and the "estimated operation of operator" may be "during assembling of part 40a". This is because, as described above, since the estimating unit 12 stores the details of respective operations and the order of executing respective operations, it is possible to estimate an operation of "during assembling of part 40a" from the "state in which operator 70 is entering working table 62".

The "operation time" is the time actually required until an operation ends after the operation starts. The operation time, for example, is obtained as a difference between the starting time of an operation and the starting time of the next operation. Although an operation time can be calculated by the difference between the starting times of two operations when operations are executed successively, there may be a period in which no operation is executed until the next operation starts after an operation ends rather than executing operations successively. In such a case, an ending time of an operation as well as the starting time may be included in a database and the difference between the starting time and the ending time may be calculated as an operation time.

As illustrated in FIG. 4B, the average operation time database stores "operation" and "average operation time" in correlation. Here, the "average operation time" is an average time of operation time which is a period elapsed until a correlated operation ends after the operation starts. The average operation time can be calculated on the basis of an operation time stored in the operation history database. Specifically, the required time calculating unit 14 reads all operation times correlated with a certain operation and averages the read operation times. The operation and the average operation time are stored in the average operation time database in correlation.

The required time calculating unit 14 calculates a required time required until an operation being executed presently ends. Specifically, a period obtained by subtracting the time elapsed from the starting time of an operation being executed presently from the average operation time of the operation being executed presently is calculated as a required time. The calculated required time is calculated with respect to the operation plan creating unit 15.

The operation plan creating unit 15 is a unit that creates an operation plan of the robot 20. The operation plan creating unit 15 stores the details of respective operations included in the operation steps and the order of executing the respective operations in order to create the operation plan. The operation plan creating unit 15 creates the operation plan on the basis of the required time calculated by the required time calculating unit 14. The created operation plan is output to the control unit 16. A method of creating the operation plan by the operation plan creating unit 15 will be described later with reference to FIG. 5.

The control unit 16 is a unit that controls the robot 20 so that the robot 20 executes an operation according to the operation plan created by the operation plan creating unit 15. The control unit 16 generates a control signal such as a position command and a control signal related to opening and closing of a gripper and outputs the generated control signal to the robot 20 so that the robot 20 executes an operation according to the operation plan created by the operation plan creating unit 15. The robot 20 executes an operation on the basis of this control signal. Moreover, the control unit 16 outputs these control signals and the like to the information acquisition unit 11 as information indicating the control state of the robot 20.

Hereinabove, the functional blocks included in the robot control device 10 have been described. The robot control device 10 includes an arithmetic processing unit such as a central processing unit (CPU) in order to realize these functional blocks. Moreover, the robot control device 10 includes an auxiliary storage device such as a hard disk drive (HDD) storing various control programs such as application software or an operating system (OS) and a main storage device such as a random access memory (RAM) for storing data which is temporarily necessary for the arithmetic processing device to execute programs.

Moreover, in the robot control device 10, the arithmetic processing device reads application software and an OS from the auxiliary storage device and performs an arithmetic process based on the application software and the OS while loading the read application software and the OS onto the main storage device. Various hardware components included in the respective devices are controlled on the basis of the arithmetic processing result. In this way, the functional blocks of the present embodiment are realized. That is, the present embodiment can be realized by cooperation of hardware and software.

Creation of Operation Plan

Next, a specific example of how the operation plan creating unit 15 creates an operation plan will be described. In this example, a case in which in the operation steps described with reference to FIG. 2, an operation plan for operations is created during execution of step S13 after the end of steps S11 and S12 will be discussed.

In this case, the operation plan creating unit 15 creates an operation plan for an operation (step S15 in FIG. 2) of conveying the part 40b from the work and part supply section 61 to the working table 62, which is the next operation. Here, the operation plan creating unit 15 creates the operation plan so that the period in which the operator 70 and the robot 20 are present in the working table 62 at the same time is minimized by taking the operation time of the operation (step S14 in FIG. 2) of the operator 70 assembling the part 40a with respect to the work 50, which is a previous step, into consideration.

For the sake of explanation, a timing chart in which the time at which the robot 20 starts conveying the part 40a is T=0 is illustrated in FIG. 5. Here, it is assumed that an average operation time of assembling the part 40a with respect to the work 50 is $T_O(a)$. Moreover, it is assumed that the average operation times required for the robot 20 to convey the parts 40a and 40b from the work and part supply section 61 to the working table 62 are $T_R(a)$ and $T_R(b)$, respectively. Furthermore, it is assumed that $T_O(a) \geq T_R(b)$.

Figure 6:
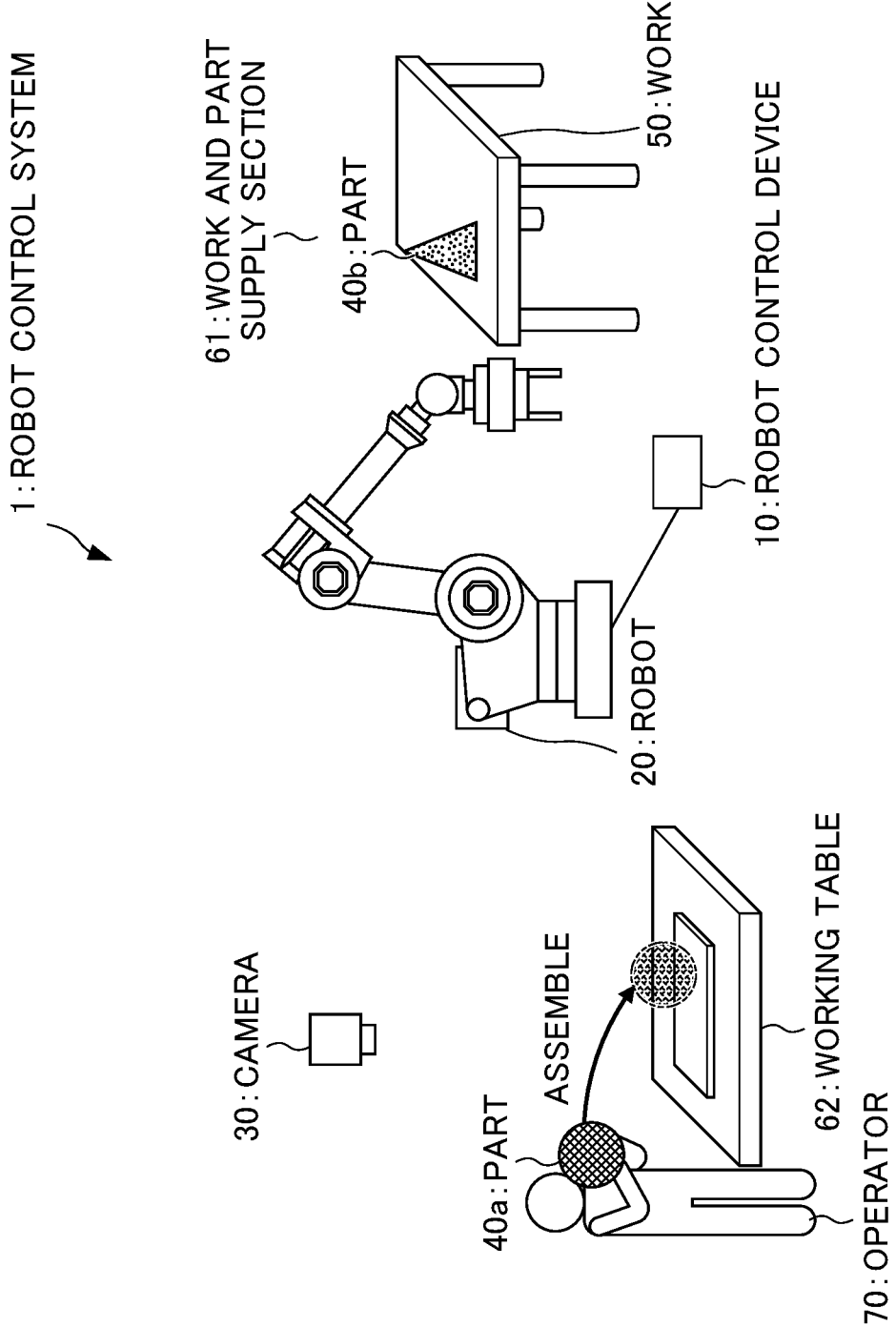
FIG. 6 is a schematic diagram for describing generation of an operation plan according to an embodiment of the present invention.

At time $T_R(a)$, the robot 20 conveys the part 40a and the operator 70 receives the part 40a from the robot 20 and starts assembling the part 40a. Subsequently, at time t, as illustrated in FIG. 6, a state in which the operator 70 assembles the part 40a and a state in which the robot 20 is about to convey the part 40b, which is the next step, are detected.

Here, as described above, a period $T_R(b)$ required for the robot 20 to convey the part 40b is shorter than a period $T_O(a)$ required for the operator 70 to assemble the part 40a. Due to this, if the robot 20 starts an operation of conveying the part 40b immediately at time t after $T_R(a)$ ends, the robot 20 may enter the working table 62 at time $(t+T_R(b))$ which is earlier than time $(T_R(a)+T_O(a))$ at which the operator 70 finishes an operation in the working table 62, and there is a possibility that the operator 70 and the robot 20 interfere with each other.

Therefore, the operation plan creating unit 15 creates the operation plan so that the time at which the robot 20 starts conveying the part 40b is delayed and the robot 20 enters the working table immediately after the operator 70 finishes assembling the part 40a.

Due to this, the operation plan creating unit 15 acquires a required time which is a remaining operation time for the operator 70 to assemble the part 40a from the required time calculating unit 14. In this case, the required time is $T_O(a)-(t-T_R(a))$.

The operation plan creating unit 15 creates the operation plan of the robot 20 so that a period in which the operator 70 and the robot 20 are present in the same working area is minimized on the basis of the required time. In this case, when the robot 20 enters the working table while carrying the part 40*b* simultaneously with the operator 70 finishing assembling the part 40*a*, the operator 70 can proceed to a step of assembling the next part 40*b* immediately. Due to this, the operation plan creating unit 15 creates the operation plan such that the start time at which the robot 20 conveys the part 40*b* is shifted to time $(T_R(a)+T_O(a)-T_R(b))$.

When the control unit 16 controls the robot 20 so as to operate according to the operation plan, the robot 20 enters the working table while carrying the part 40*b* simultaneously with the operator 70 finishing assembling the part 40*a*.

In the present embodiment, by creating the operation plan in this way, it is possible to minimize a period in which the operator 70 and the robot 20 are present in the same working area and a waiting period of the operator as much as possible. Moreover, it is possible to minimize the possibility that the operator 70 and the robot 20 interfere with each other and to improve the essential safety. That is, it is possible to provide a highly safe robot system without decreasing productivity by optimizing the operation steps.

Although it is necessary to perform learning to update parameters of the hidden Markov model in the technique disclosed in Patent Document 1, it is not necessary to perform such learning in the present embodiment. Furthermore, although it is necessary to stop a production line during learning in the technique disclosed in Patent Document 1, it is possible to accumulate the average operation time while operating the production line in the present embodiment.

Operation of Present Embodiment

Figure 7:
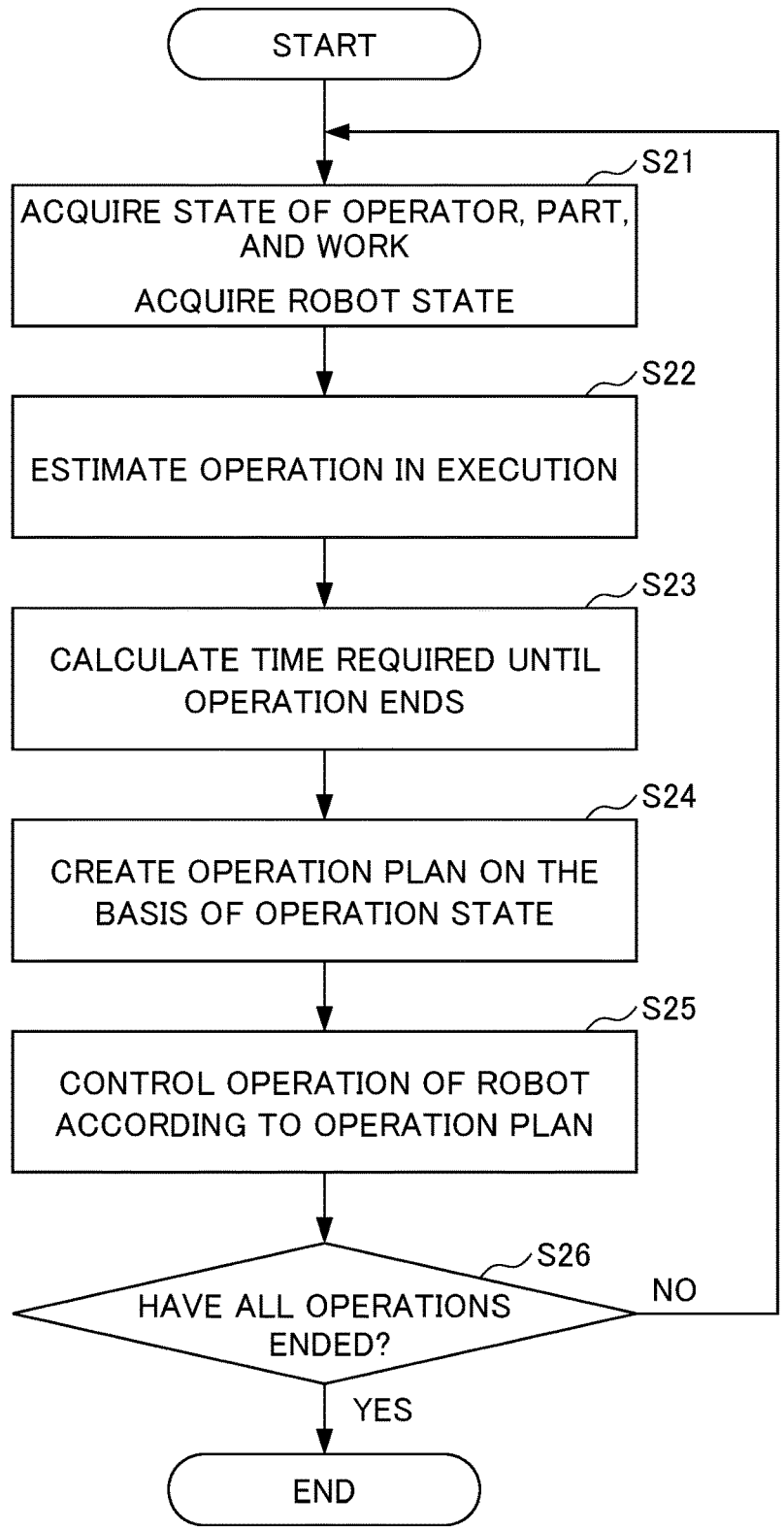
FIG. 7 is a flowchart illustrating an operation of an embodiment of the present invention.

Next, the operation of the present embodiment will be described with reference to the flowchart of FIG. 7. First, the information acquisition unit 11 acquires capturing data of the surroundings of the working table 62 from the camera 30 as information indicating the state of the robot control device 10, the part 40, and the work 50. Moreover, the information acquisition unit 11 acquires a control signal and a feedback signal output to the robot 20 as information indicating the state of the robot 20 (step S21).

Subsequently, the estimating unit 12 estimates operations in execution (step S22). Moreover, the required time calculating unit 14 calculates a required time required until an operation in execution ends on the basis of the estimation result obtained by the estimating unit 12 (step S23).

Furthermore, the operation plan creating unit 15 creates an operation plan on the basis of the calculated required time and the details and the order of the operation steps (step S24).

The control unit 16 controls the robot 20 so as to execute an operation according to the operation plan (step S25).

Subsequently, the operation plan creating unit 15 determines whether all operations included in the operation steps have ended (step S26). When all operations have not ended (step S26: NO), the process proceeds to step S21 again, and the above-described process is repeated for the subsequent operations. On the other hand, when all operations have ended (step S26: YES), the process ends. By the above-described operation, the present embodiment provides such advantages as described in section <Creation of Operation Plan>.

Note that the above-described respective devices included in the robot control system can be realized respectively by hardware, software, or a combination thereof. Moreover, a robot control method performed by cooperation of the above-described respective devices included in the robot control system can also be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path. The above-described embodiment is a preferred embodiment of the present invention. However, the scope of the present invention is not limited to the embodiment only but the present invention can be embodied in various modifications without departing from the spirit of the present invention. For example, the present invention can be modified in modifications to be described below.

Modification 1

In the above-described embodiment, the operation history database is created regardless of who the operator 70 is. Moreover, the average operation time is calculated on the basis of the operation history database created in this manner. However, the operation time of the operator 70 may differ from person to person. For example, the operation time of the operator 70 who is a skilled person in operations may be different from the operation time of the operator 70 who is a beginner in operations.

Therefore, who the operator 70 is may be distinguished. For this, in order to identify the respective operators 70, identification information (for example, an ID number) is allocated to each of the operators 70. In the operation history database, the operation time is stored for respective ID numbers by distinguishing the respective operators 70 from each other. Furthermore, when the average operation time is calculated, the average operation time is calculated for respective ID numbers by distinguishing the respective operators 70. By doing so, it is possible to create the operation plan by taking the capability of the respective operators 70 into consideration.

Modification 2

In the above-described embodiment, the required time is calculated on the basis of an average operation time obtained by averaging the operation times stored in the operation history database. Instead of this, the required time may be calculated on the basis of the median value or the most frequency value of the operation times stored in the operation history database.

Modification 3

In the above-described embodiment, the state of the robot control device 10, the part 40, and the work 50 is specified on the basis of the capturing data obtained by the camera 30. Instead of this, the state of the robot control device 10, the part 40, and the work 50 may be specified on the basis of measurement information obtained by a sensor or the like. For example, a motion sensor may be attached to a helmet that the operator 70 wears and the state of the operator 70 may be specified on the basis of measurement information obtained by the motion sensor.

Modification 4

In the above-described embodiment, it is assumed that the robot 20 is realized as an ordinary industrial robot. Moreover, the occurrence of interference is prevented by creating an operation plan so that the robot 20 and the operator 70 do not interfere with each other. However, for example, when the operator 70 performs an unexpected operation, the robot 20 and the operator 70 may interfere with each other. Therefore, the robot 20 may be realized as a robot that stops operating automatically when a force sensor or the like detects the occurrence of interference by taking this into consideration. In this way, it is possible to secure the safety of users even if interference occurs.

Modification 5

In the above-described embodiment, it is assumed that the robot control device 10 and the robot 20 are realized as separate devices. Instead of this, the robot control device 10 and the robot 20 may be realized as the same device. Alternatively, a portion or all of the functional blocks of the robot control device 10 may be realized by the same device as the robot 20.

Modification 6

In the above-described embodiment, a case in which the robot 20 and the operator 70 are in one-to-one relation is assumed. Instead of this, the present embodiment may be applied to a case in which the robot 20 and the operator 70 are in a one-to-multiple relation or a multiple-to-multiple relation.

Modification 7

In the above-described embodiment, a case in which the robot 20 and the operator 70 enter the working table 62 alternately is assumed. Instead of this, the present embodiment may be applied to a case in which the robot 20 and the operator 70 performs operations simultaneously in the working table 62. This modification will be described with reference to FIGS. 8 and 9. In this modification, the operator 70 assembles parts 40c and 40d with respect to the work 50. When the operator 70 assembles the part 40c, the robot 20 maintains the part 40c at a predetermined position so that the part 40c can be assembled easily. For example, when the work 50 is a vehicle body of an automobile, the part 40c which is a wheel is maintained at a predetermined position so that the part 40c can be assembled easily.

Figure 8:
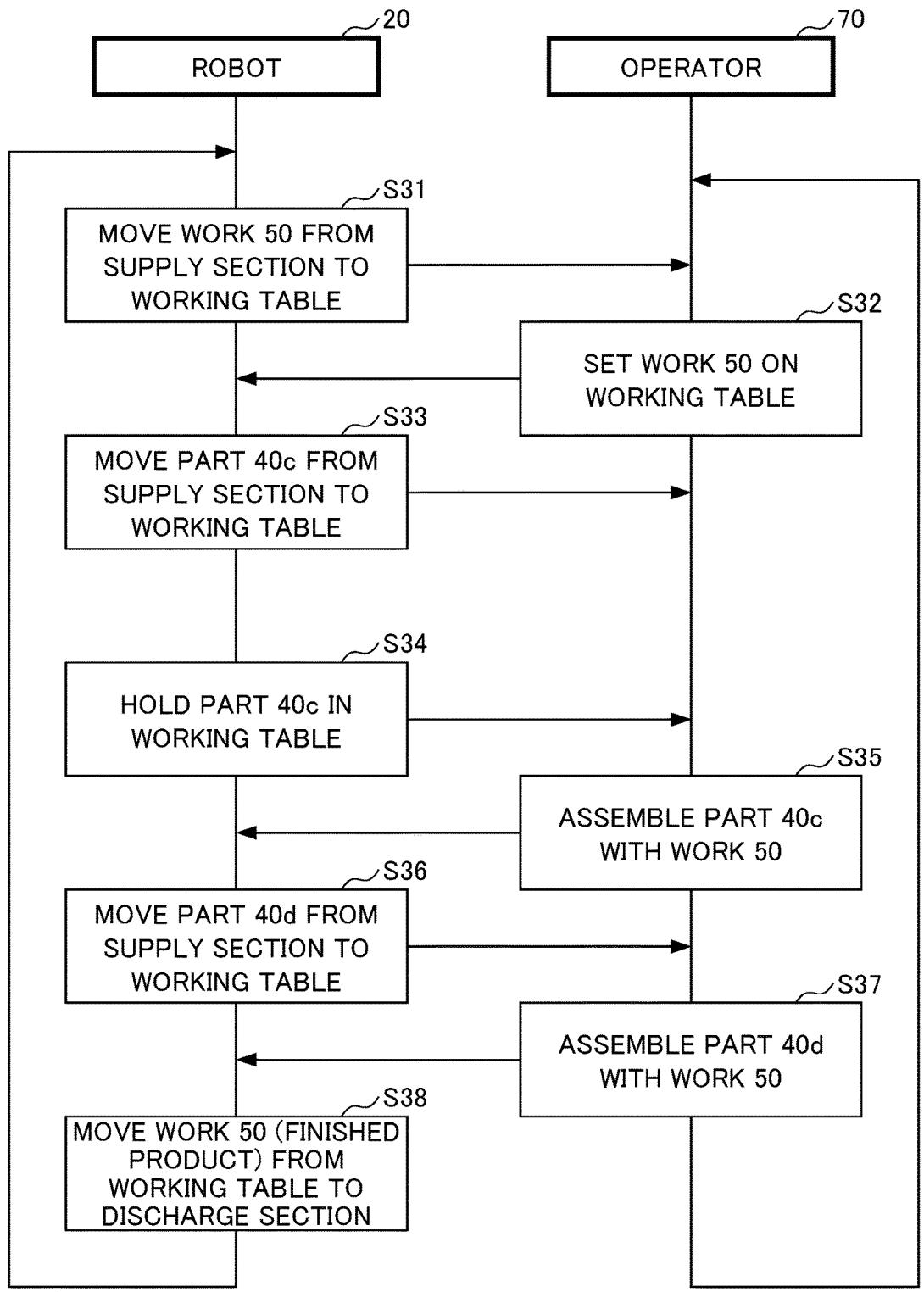
FIG. 8 is a sequence diagram illustrating an example of operation steps to which a modification of the embodiment of the present invention is applied.

Steps of this operation will be described with reference to the flowchart of FIG. 8. First, the robot 20 conveys the work 50 mounted in the work and part supply section 61 with respect to the working table 62 (step S31). The operator 70 sets the conveyed work 50 on the working table 62 (step S32).

The robot 20 conveys the part 40c mounted in the work and part supply section 61 with respect to the working table 62 (step S33). The robot 20 maintains the part 40c at a predetermined position of the working table 62 (step S34). This operation is different from that of the above-described embodiment. The operator 70 assembles the part 40c held by the robot 20 with respect to the work 50 (step S35).

Subsequently, the robot 20 conveys the part 40d mounted in the work and part supply section 61 with respect to the working table 62 (step S36). The operator 70 assembles the conveyed part 40d with respect to the work 50 (step S37). In this way, a finished product is obtained. After that, the robot 20 conveys the obtained finished product with respect to the finished product discharge section 63 (step S38).

Next, a specific example of how the operation plan creating unit 15 creates an operation plan will be described. In this modification, a case in which in the operation steps described with reference to FIG. 8, an operation plan for operations is created during execution of step S33 after the end of steps S31 and S32 will be discussed.

In this case, the operation plan creating unit 15 creates an operation plan for an operation (step S36 in FIG. 8) of conveying the part 40d from the work and part supply section 61 to the working table 62, which is the next operation. Here, the operation plan creating unit 15 creates the operation plan so that the period in which the operator 70 and the robot 20 are present in the working table 62 at the same time is minimized by taking the operation time of the operation (step S35 in FIG. 8) of the operator 70 assembling the part 40c with respect to the work 50, which is a previous step, into consideration.

Figure 9:
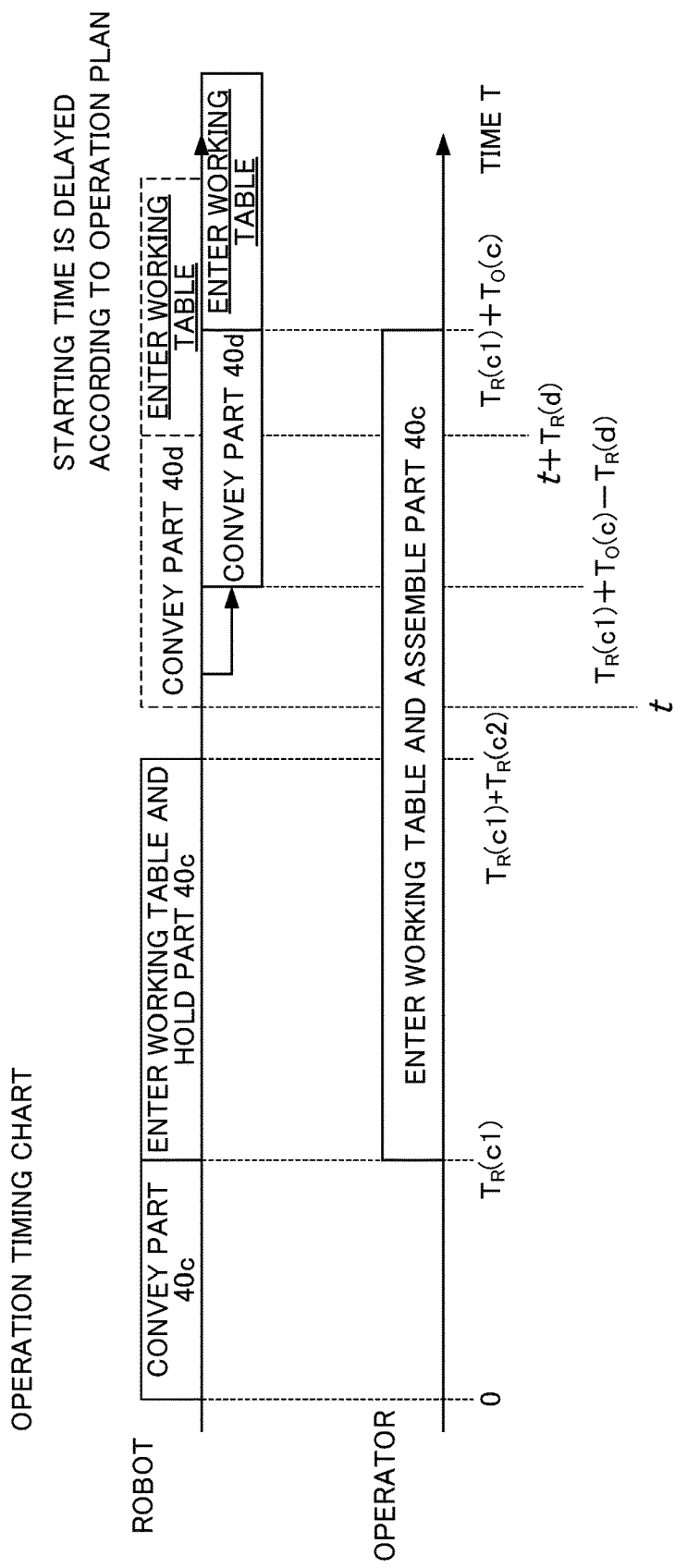
FIG. 9 is a timing chart for describing generation of an operation plan according to a modification of the embodiment of the present invention.

For the sake of explanation, a timing chart in which the time at which the robot 20 starts conveying the part 40c is T=0 is illustrated in FIG. 9. Here, it is assumed that an average operation time of assembling the part 40c with respect to the work 50 is $T_O(a)$. Moreover, it is assumed that the average operation times required for the robot 20 to convey the parts 40c and 40d from the work and part supply section 61 to the working table 62 are $T_R(c1)$ and $T_R(d)$, respectively. Furthermore, it is assumed that the average operation time required for the robot 20 to enter the working table 62 to hold the part 40c in the working table 62 is $T_R(c2)$. Furthermore, it is assumed that $T_O(c) \geq TR(d)$.

At time $T_R(c1)$, the robot 20 conveys the part 40c, and after that, the robot 20 holds the part 40c in the working table 62. The part 40c is held until time $(T_R(c1)+T_R(c2))$. At the same time, the operator 70 receives the part 40c from the robot 20 and assembles the part 40c.

Subsequently, it is assumed that at time t, a state in which the operator 70 assembles the part 40c and a state in which the robot 20 is about to convey the part 40d, which is the next step, are detected.

Here, as described above, a period $T_R(d)$ required for the robot 20 to convey the part 40d is shorter than a period $T_O(c)$ required for the operator 70 to assemble the part 40c. Due to this, if the robot 20 starts an operation of conveying the part 40d immediately at time t after $T_R(c)$ and $T_R(c2)$ end, the robot 20 may enter the working table 62 at time $(t+T_R(d))$ which is earlier than time $(T_R(c1)+T_O(c))$ at which the operator 70 finishes an operation in the working table 62, and there is a possibility that the operator 70 and the robot 20 interfere with each other.

Therefore, the operation plan creating unit 15 creates the operation plan so that the time at which the robot 20 starts conveying the part 40d is delayed and the robot 20 enters the working table immediately after the operator 70 finishes assembling the part 40c. Due to this, the operation plan creating unit 15 acquires a required time which is a remaining operation time for the operator 70 to assemble the part 40c from the required time calculating unit 14. In this case, the required time is $T_O(c)-(t-T_R(c1))+T_R(c2)$.

The operation plan creating unit 15 creates the operation plan of the robot 20 so that a period in which the operator 70 and the robot 20 are present in the same working area is minimized on the basis of the required time.

In this case, when the robot 20 enters the working table while carrying the part 40d simultaneously with the operator 70 finishing assembling the part 40c, the operator 70 can proceed to a step of assembling the next part 40d immediately. Due to this, the operation plan creating unit 15 creates the operation plan such that the start time at which the robot 20 conveys the part 40d is shifted to time $(T_R(c1)+T_O(c)-T_R(d))$.

When the control unit 16 controls the robot 20 so as to operate according to the operation plan, the robot 20 enters the working table while carrying the part 40d simultaneously with the operator 70 finishing assembling the part 40c. That is, it is possible to obtain the same advantages as those of the above-described embodiment even when the robot 20 and the operator 70 execute operations simultaneously in the working table 62 as in the case of this modification.

EXPLANATION OF REFERENCE NUMERALS

1: Robot control system
10: Robot control device
11: Information acquisition unit
12: Estimating unit
13: Operation time recording unit
14: Required time calculating unit
15: Operation plan creating unit
16: Control unit
20: Robot
30: Camera
40a, 40b: Part
50: Work
61: Work and part supply section
62: Working table
63: Finished product discharge section
70: Operator

What is claimed is:

1. A robot control device that controls a robot that executes operations in the same area as an operator, the robot control device comprising:
  an information acquisition unit that acquires information indicating a control state of the robot, information indicating an attitude of the operator, and information indicating a position of an operating target object in the operations;
  an estimating unit that estimates an operation in execution on a basis of respective pieces of information acquired by the information acquisition unit;
  a required time calculating unit that calculates a required time required until the operation in execution ends on a basis of the estimated operation in execution;
  an operation plan creating unit that creates an operation plan of the robot on a basis of the required time; and
  a control unit that controls the robot so as to execute operations according to the operation plan.

2. The robot control device according to claim 1, further comprising:
  an operation time recording unit that stores the estimated operation of the estimating unit and an operation time which is a time elapsed until the estimated operation ends after the estimated operation starts in correlation, wherein
  the required time calculating unit reads an operation time corresponding to a calculation target operation of the required time from the operation time recording unit and calculates the required time on a basis of the read operation time.

3. The robot control device according to claim 2, wherein the required time calculating unit calculates a time obtained by averaging the read operation times as the required time.

4. The robot control device according to claim 1, wherein the information acquisition unit further acquires identification information for identifying the operator, and
  the required time calculating unit calculates the required time required until the operation in execution ends on the basis of the estimated operation in execution and an operator specified on the basis of the acquired identification information.

5. The robot control device according to claim 1, wherein the operation plan creating unit creates the operation plan so that the robot enters the same area after the required time of the operation by the operator has elapsed.

6. The robot control device according to claim 1, wherein the operation plan creating unit creates the operation plan so that a period in which the robot and the operator are present in the same area decreases.

7. The robot control device according to claim 1, wherein the operation plan creating unit creates the operation plan so that a waiting period of the operator decreases.

8. A non-transitory computer readable medium having recorded thereon a robot control program for causing a computer to function as a robot control device that controls a robot that executes operations in the same area as an operator, the robot control device comprising:
  an information acquisition unit that acquires information indicating a control state of the robot, information indicating an attitude of the operator, and information indicating a position of an operating target object in the operations;
  an estimating unit that estimates an operation in execution on a basis of respective pieces of information acquired by the information acquisition unit;
  a required time calculating unit that calculates a required time required until the operation in execution ends on a basis of the estimated operation in execution;
  an operation plan creating unit that creates an operation plan of the robot on a basis of the required time; and
  a control unit that controls the robot so as to execute operations according to the operation plan.

* * * * *